United States Patent
Frieling et al.

(10) Patent No.: US 10,493,820 B2
(45) Date of Patent: Dec. 3, 2019

(54) COATING OF THE ECS PRIMARY HEAT EXCHANGER (PHX) WITH LOW TEMPERATURE CATALYST FOR OZONE AND/OR VOLATILE ORGANIC COMPOUNDS (VOC) AND/OR CARBON MONOXIDE CONVERSION

(71) Applicant: HONEYWELL INTERNATIONAL INC., Morris Plains, NJ (US)

(72) Inventors: Ralf Von Frieling, Stelle (DE); Jan Ludvik, Jesenice (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 12 days.

(21) Appl. No.: 15/699,330

(22) Filed: Sep. 8, 2017

(65) Prior Publication Data

US 2019/0077219 A1    Mar. 14, 2019

(51) Int. Cl.
| | | |
|---|---|---|
| *B60H 1/00* | (2006.01) | |
| *F28F 13/18* | (2006.01) | |
| *F28F 19/02* | (2006.01) | |
| *B60H 1/18* | (2006.01) | |
| *B64D 13/08* | (2006.01) | |
| *F28D 15/02* | (2006.01) | |
| *F24F 13/065* | (2006.01) | |
| *B64D 13/06* | (2006.01) | |

(52) U.S. Cl.
CPC ............. *B60H 1/18* (2013.01); *B64D 13/08* (2013.01); *F28D 15/0266* (2013.01); *B60H 1/00271* (2013.01); *B64D 2013/0685* (2013.01); *F24F 13/065* (2013.01)

(58) Field of Classification Search
CPC .......... F24F 13/065; B60H 1/18; B64D 13/08; F28D 15/0266
USPC ..................................................... 165/41, 133
See application file for complete search history.

(56) References Cited

U.S. PATENT DOCUMENTS

| | | | |
|---|---|---|---|
| 4,374,469 A | | 2/1983 | Rannenberg |
| 4,665,973 A | * | 5/1987 | Limberg ............ B01D 53/8675 165/133 |
| 5,151,022 A | | 9/1992 | Emerson |
| 5,511,385 A | * | 4/1996 | Drew ..................... B64D 13/06 62/172 |
| 5,704,218 A | | 1/1998 | Christians |

(Continued)

FOREIGN PATENT DOCUMENTS

| | | |
|---|---|---|
| DE | 10201426 A1 | 7/2003 |
| EP | 0186477 A2 | 7/1986 |
| WO | 2015055672 A1 | 4/2015 |

OTHER PUBLICATIONS

Search and opinion in EP 18191354.2, dated Feb. 1, 2019.

*Primary Examiner* — Paul Alvare
(74) *Attorney, Agent, or Firm* — Shimokaji IP

(57) ABSTRACT

A heat exchanger assembly includes a main heat exchanger that receives a main hot air; a secondary heat exchanger operatively adjacent to the main heat exchanger; wherein the secondary heat exchanger receives a secondary hot air; wherein the main hot air and the secondary hot air are from two different, direct air sources; wherein a hot air channel of only one of the main and the secondary heat exchangers includes a catalytic coating; and a temperature control that controls the temperature of only one of the main hot air and the secondary hot air into the hot air channel.

7 Claims, 6 Drawing Sheets

(56) References Cited

U.S. PATENT DOCUMENTS

| | | | |
|---|---|---|---|
| 5,833,931 A | | 11/1998 | Fromson |
| 5,939,800 A * | | 8/1999 | Artinian .................. B64D 13/06 |
| | | | 244/53 R |
| 6,124,646 A * | | 9/2000 | Artinian .................. B64D 13/06 |
| | | | 290/52 |
| 6,148,622 A * | | 11/2000 | Sanger ................... B64D 13/06 |
| | | | 62/402 |
| 6,257,003 B1 * | | 7/2001 | Hipsky ................... B64D 13/06 |
| | | | 62/402 |
| 6,584,760 B1 * | | 7/2003 | Lipinski ............. B01D 53/8625 |
| | | | 165/4 |
| 7,334,422 B2 * | | 2/2008 | Zywiak .................. B64D 13/06 |
| | | | 62/401 |
| 7,629,290 B2 | | 12/2009 | Michalakos et al. |
| 2003/0185720 A1 | | 10/2003 | Tom |
| 2015/0314877 A1 * | | 11/2015 | McAuliffe ................ F02C 6/08 |
| | | | 62/61 |
| 2015/0360786 A1 * | | 12/2015 | Oberpriller ............ B64D 13/08 |
| | | | 165/51 |

\* cited by examiner

COATING OF THE ECS PRIMARY HEAT EXCHANGER (PHX) WITH LOW TEMPERATURE CATALYST FOR OZONE AND/OR VOLATILE ORGANIC COMPOUNDS (VOC) AND/OR CARBON MONOXIDE CONVERSION

BACKGROUND OF THE INVENTION

The present invention generally relates to environmental control systems (ECSs) and, more particularly, to apparatus and methods of ozone and/or Volatile Organic Compounds (VOC) and/or carbon monoxide conversion in ECSs.

In aircraft, current ECSs receive high pressure air in the form of bleed air from an engine and/or air from an auxiliary power unit (APU). A precooler may receive the bleed air from the engine, while an ozone converter (OC) or combined hydrocarbon and ozone converter (CHOC) or carbon monoxide converter (CMC) may receive both the precooler exhaust with the APU air. From the OC or CHOC or CMC, an air conditioning pack may receive the exhaust flow and send it to the cabin. On more electric aircrafts, the ECS receives air from dedicated Cabin Air Compressors (CAC).

A full bleed ECS for some aircraft has a heat exchanger inlet temperature of ~200° C. and a normal temperature drop >80° C. Because of the high temperature drop over the heat exchanger, the performance of current catalysts for ozone conversion do not meet the end of life (EOL) requirements. For some hybrid/full electrical aircraft, ECS inlet temperatures are between 30° C.-150° C. With the current OC catalyst, EOL performance can decrease.

Reducing maintenance requirements and increasing EOL performance can produce lower operating costs. Weight reductions that result in fuel savings can also mean lower operating costs and can sometimes be achieved by the elimination of system components.

As can be seen, there is a need for improved apparatus and methods to achieve ozone and/or hydrocarbon and/or carbon monoxide removal from an ECS.

SUMMARY OF THE INVENTION

In one aspect of the present invention, an environmental control system comprises a first air management subsystem having: a first heat exchanger assembly that includes a first main heat exchanger and a first secondary heat exchanger; wherein only one of the first main and first secondary heat exchangers have a catalytic coating; wherein the first main and the first secondary heat exchangers receive an ambient air; wherein the first main heat exchanger receives a first hot air; wherein the first second heat exchanger receives a second hot air; a first air cycle machine that produces the hot air into the first main heat exchanger assembly and that produces a first conditioned air to a first enclosed environment; a second air management subsystem having: a second heat exchanger assembly that includes a second main heat exchanger and a second secondary heat exchanger; wherein only one of the second main and the second secondary heat exchangers have a catalytic coating; wherein the second main and the second secondary heat exchangers receive an ambient air; wherein the second main heat exchanger receives the first hot air; wherein the second secondary heat exchanger receives the first hot air; a second air cycle machine downstream of the second secondary heat exchanger and that produces a second conditioned air to the second main heat exchanger and further to a second enclosed environment.

In another aspect of the present invention, heat exchanger assembly comprises a main heat exchanger that receives a main hot air; a secondary heat exchanger operatively adjacent to the main heat exchanger; wherein the secondary heat exchanger receives a secondary hot air; wherein the main hot air and the secondary hot air are from two different, direct air sources; wherein a hot air channel of only one of the main and the secondary heat exchangers includes a catalytic coating; and a temperature control that controls the temperature of only one of the main hot air and the secondary hot air into the hot air channel.

In a further aspect of the present invention, a heat exchanger assembly comprises a main heat exchanger that receives a main hot air and discharges a used cool air; a primary heat exchanger in contact with the main heat exchanger, wherein the primary heat exchanger includes: a plurality of hot air channels that receive a primary hot air; a plurality of cold air channels that receive the used cool air from the main heat exchanger; wherein the hot air channels are disposed perpendicular to the cold air channels; a catalytic coating that coats at least one of the hot air channels and does not coat the main heat exchanger; wherein the catalytic coating removes, from the primary hot air, at least one of ozone and hydrocarbons and carbon monoxide when the primary hot air is between 30° C. and 250° C.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides an environmental control system (ECS) that may be implemented in vehicles, such as aircraft, to provide conditioned air to one or more enclosed environments. The ECS may include an air generation subsystem (AGS) that provides conditioned air to an aircraft cabin, and a conditioned service air subsystem (CSAS) that provides conditioned air to an inert gas generation subsystem (IGGS) of an aircraft. The AGS and/or the CSAS may include a heat exchanger assembly that includes two heat exchangers. One of the heat exchangers may include a catalytic coating on only a "hot side" or "hot fins" of the heat exchanger, but not on a "cold side" or "cold fins". A temperature of the hot air entering the hot fins may be controlled to optimize the performance of the catalytic coating.

Herein, the terms "direct" or "directly" refers to two components that are upstream or downstream of one another without a third component there between, other than ducting that enables an air flow between the two components.

Figure 1:
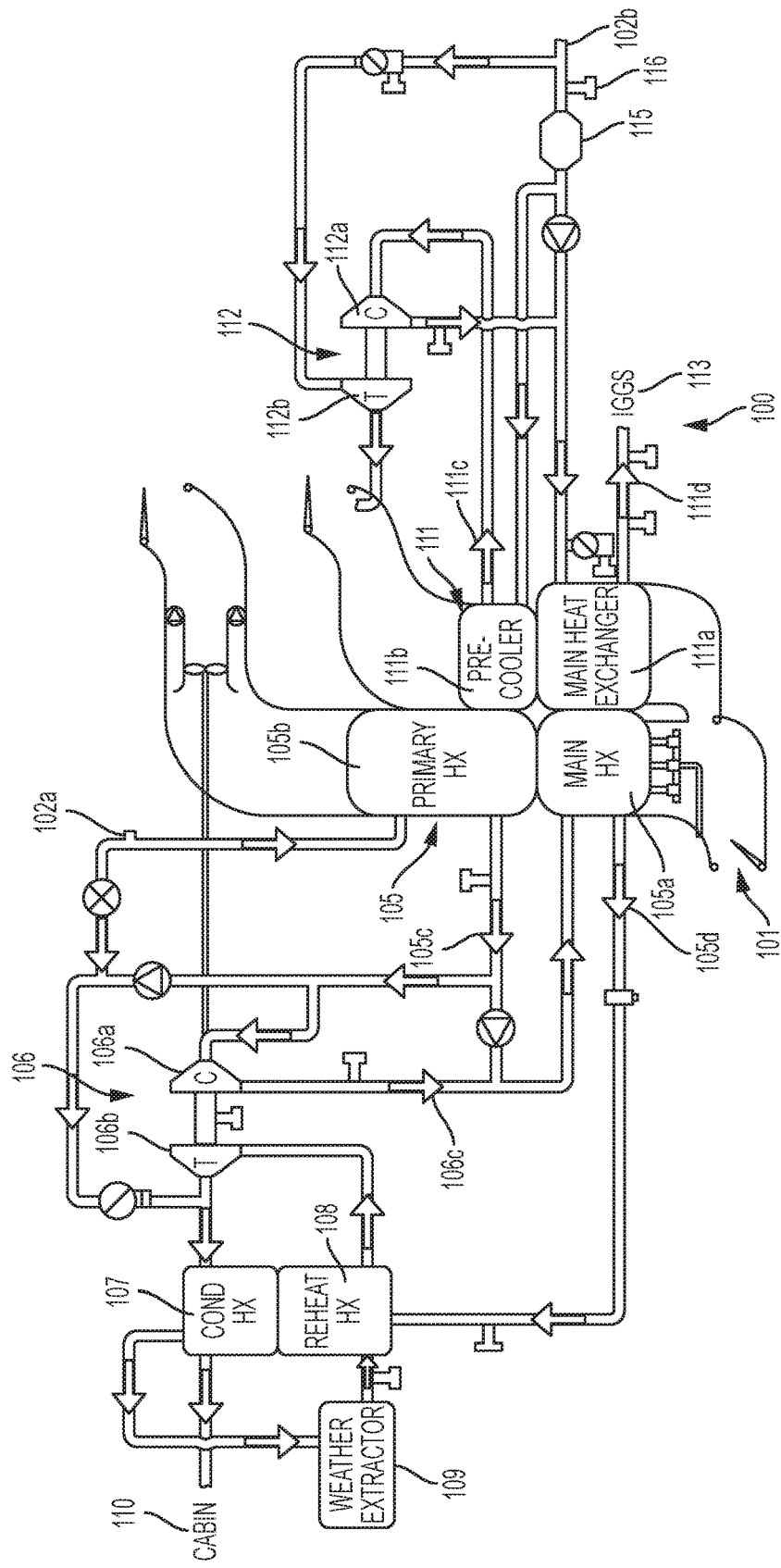
FIG. 1 is a schematic diagram of an environmental control system (ECS) in accordance with an exemplary embodiment of the present invention.

FIG. 1 is a schematic diagram of an exemplary embodiment of an environmental control system (ECS) 100. The ECS 100 may include one or more air management subsystems, such as an air generation subsystem (AGS) 103 and a conditioned service air subsystem (CSAS) 104. In an exemplary embodiment of two air management subsystems, both subsystems 103, 104 can receive one ambient or cool air (such as ram air of an aircraft) and can receive one hot compressed air (such as bleed air of an aircraft) which is conditioned by the ambient cool air.

In an exemplary embodiment, the first air management subsystem 103, such as the AGS, may receive, from only one air source, a cool air such as ambient air. The AGS 103 may condition two hot airs from two different, direct air sources, as described below. A first conditioned air can exit the AGS 103 and flow into a first enclosed environment 110, such as a cabin of an aircraft.

To produce the first conditioned air, the AGS 103 may include a first heat exchanger assembly 105 that has a first main heat exchanger (MHX) 105a and, directly downstream therefrom, a first secondary heat exchanger (or first primary heat exchanger (PHX) 105b. In embodiments, the MHX 105a may be immediately adjacent to and/or in physical contact with the PHX 105b. One or both of the MHX 105a and the PHX 105b may have a cross flow configuration whereby "hot air channels" and "cold air channels" are generally perpendicular to one another. One or more of the hot channels in one or both of the MHX 105a and the PHX 105b may have a serpentine fin configuration. In embodiments, only one of the MHX 105a and the PHX 105b have a catalytic coating.

The first heat exchanger assembly 105, and in particular the MHX 105a, may receive an ambient air 101. From the MHX 105a, a used cool air may exit therefrom and enter the PHX 105b. Also from the MHX 105a, an air flow 105d may exit and enter a reheater 108 described below.

The first heat exchanger assembly 105, and in particular the PHX 105b, may directly receive a primary hot air 102a from one direct hot air source such as an engine and/or APU and/or CAC. In an aircraft, the hot air 102a can be engine and/or APU and/or CAC bleed air for heat exchange with the used cool air from the MHX 105a. From the PHX 105b, the used cool air, from the MHX 105a, may exit the ECS 100, such as to overboard of an aircraft. Also from the PHX 105b, an air flow 105c may become part of an air flow that enters a condenser 107 described below. Alternatively, or in addition, the air flow 105c may join a main air flow 106c that enters the MHX 105a as described below.

Directly downstream of the PHX 105b may be a first air cycle machine (ACM) 106 that can include a compressor 106a and a turbine 106b on a common shaft there between. The compressor 106a may receive the air flow 105c from the PHX 105b and may, as another direct hot air source, produce the main hot air 106c that directly enters the MHX 105a for heat exchange with the ambient air 101.

A condenser 107 may be directly downstream of the first ACM 106, and in particular the turbine 106b. The condenser 107 may produce the first conditioned air that can flow into the first enclosed environment 110. A water extractor 109 may be directly downstream of the condenser 107. A reheater 108 may be directly downstream of the water extractor 109, directly upstream of the turbine 106b, and directly downstream of the MHX 105a.

As can be seen, the AGS 103 does not require an ozone and/or hydrocarbon and/or carbon monoxide converter, upstream of the first heat exchanger assembly 105. The AGS 103 can therefore eliminate the need of dedicated catalytic converter that has been needed in the prior art.

Still referring to FIG. 1, in an exemplary embodiment, the second air management subsystem 104, such as the CSAS, may receive the ambient or cool air 101. The CSAS 104 may condition two hot airs from two different, direct air sources, as described below. A second conditioned air can exit the CSAS 104 and flow into a second enclosed environment 113, such as an inert gas generation system (IGGS) of an aircraft.

To produce the second conditioned air, the CSAS 104 may include a second heat exchanger assembly 111 that has a second main heat exchanger (MHX) 111a and, directly downstream therefrom, a second secondary heat exchanger (or second precooler heat exchanger)(PHX) 111b. In embodiments, the MHX 111a may be immediately adjacent to and/or in physical contact with the PHX 111b. One or both of the MHX 111a and the PHX 111b may have a cross flow configuration whereby "hot air channels" and "cold air channels" are generally perpendicular to one another. One or more of the hot air channels in one or both of the MHX 111a and the PHX 111b may have a serpentine fin configuration. In embodiments, only one of the MHX 111a and the PHX 111b have a catalytic coating.

The second heat exchanger assembly 111, and in particular the MHX 111a, may receive the ambient air 101, as well as a main or primary hot air 102b directly from one air source such as an engine. In an aircraft, the hot air 102b can be engine and/or APU and/or CAC bleed air. The hot air 102b may optionally pass through an ozone converter 115 before reaching the MHX111a.

From the MHX 111a, a used cool air may exit therefrom and enter the PHX 111b. Also from the MXH 111, a second conditioned air 111d may exit therefrom and enter the second enclosed environment 113, such as the IGGS.

The second heat exchanger assembly 111, and in particular the PHX 111b, may also receive the hot air 102b for heat exchange with the used cool air from the MHX 111a. From the PHX 111b, the used cool air, from the MHX 111a, may exit the ECS 100, such as to overboard of an aircraft. Also from the PHX 111b, an air flow 111c may exit therefrom and enter a second air cycle machine (ACM) or turbo-compressor 112.

The second ACM or turbo compressor 112 may be directly downstream of the PHX 111b and can include a compressor 112a and a turbine 112b on a common shaft there between. The turbine 112b may receive the hot air 102b. The compressor 112a may receive the air flow 111c from the PHX 111b. From the compressor 112a, an air flow may join the hot air 102b before entering the MHX 111a.

A temperature sensor/controller (such as 116) may be employed to sense the temperature of hot air 102a and/or hot air 102b. The sensed temperature may then be used to alter a temperature of the hot air 102a and/or 102b and, therefore, the operation of the catalytic coating described above. In embodiments, the catalytic coating may operate when the temperature of the hot air 102a and/or 102b is between about 30° C. and 250° C.

Figure 2:
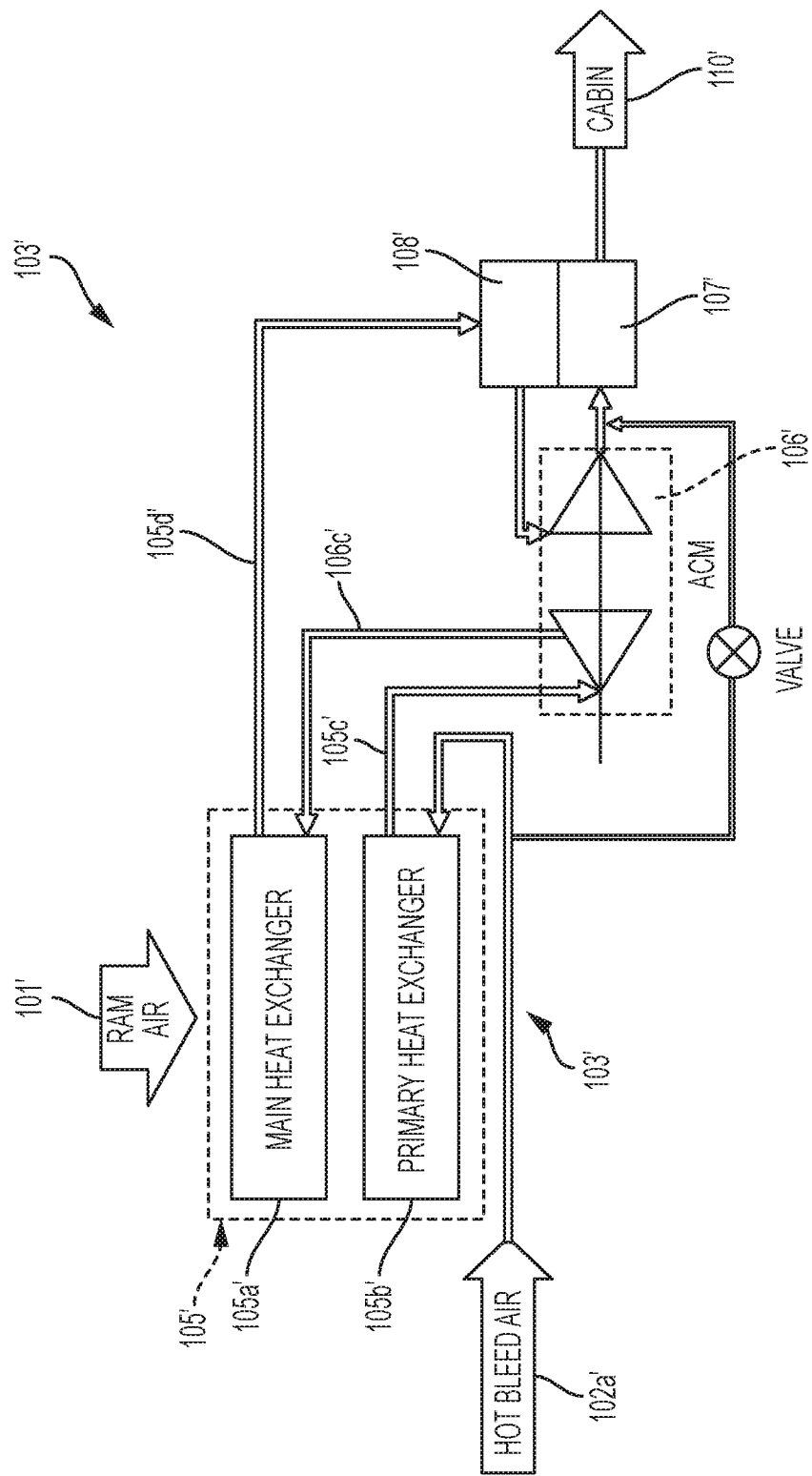
FIG. 2 is a schematic diagram of an air generation subsystem (AGS) that may be employed in the ECS of FIG. 1.

FIG. 2 is a schematic diagram of a first air management subsystem (AGS) 103'. It has been simplified to better show main components of the AGS 103'. The reference numbers in FIG. 2 correspond to those in FIG. 1.

Figure 3:
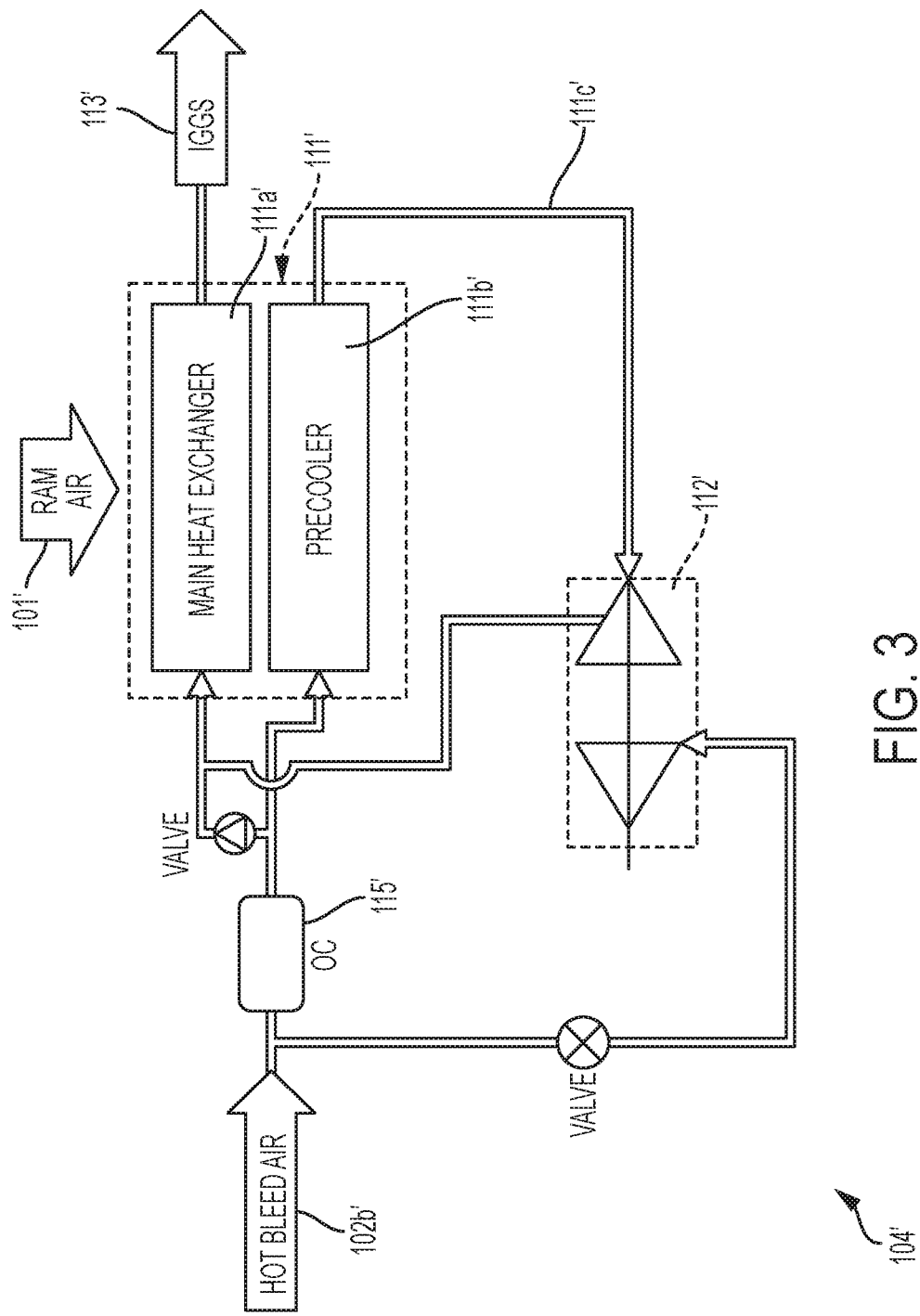
FIG. 3 is a schematic diagram of a conditioned service air subsystem (CSAS) that may be employed in the ECS of FIG. 1

FIG. 3 is a schematic diagram of a second air management subsystem (CSAS) 104'. It has been simplified to better show main components of the CSAS 104'. The reference numbers in FIG. 3 correspond to those in FIG. 1.

Figure 4:
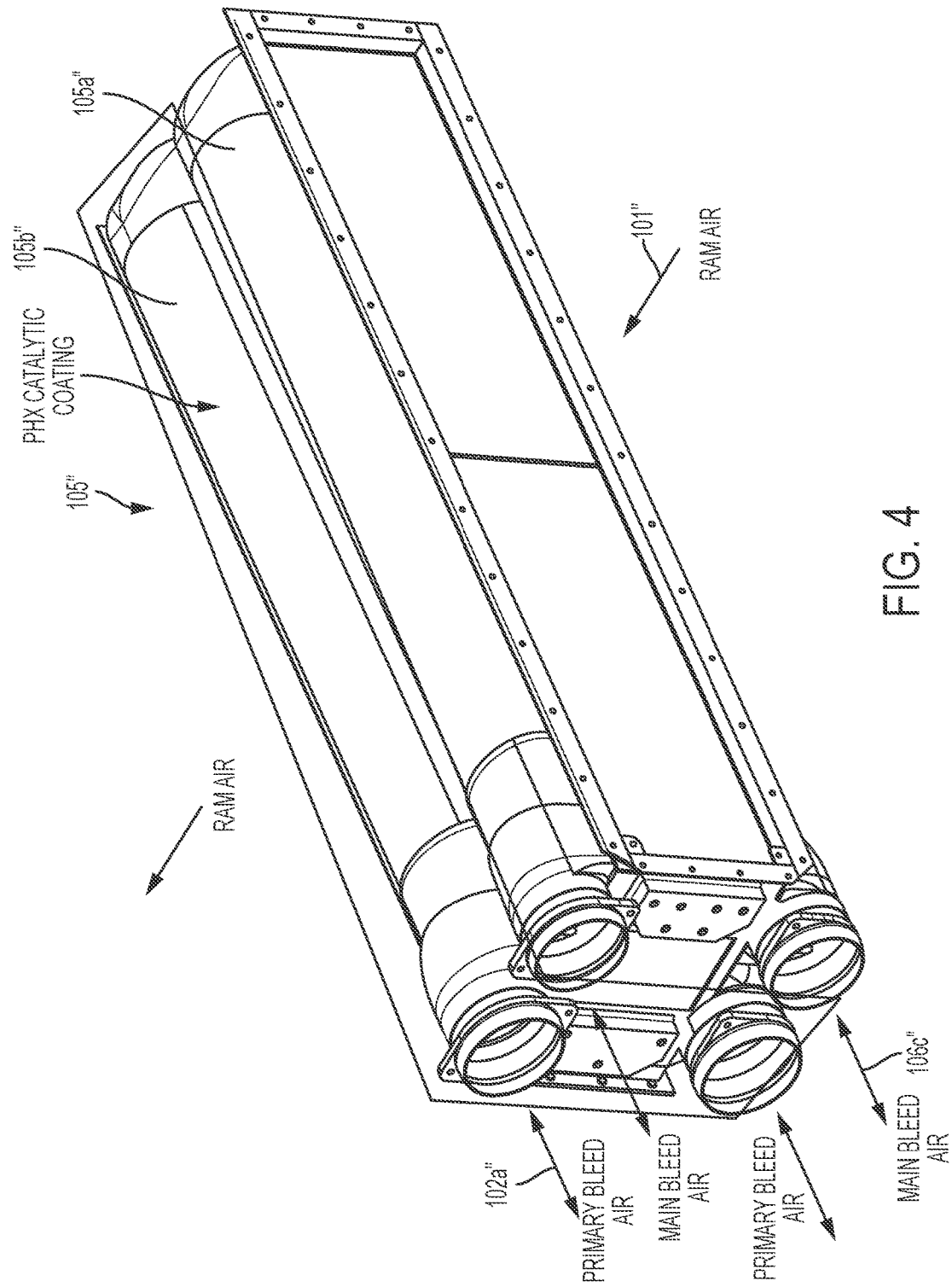
FIG. 4. is a perspective view of a catalytic heat exchanger that may be employed in the ECS of FIG. 1.

FIG. 4 is a perspective view of a heat exchanger assembly 105" that can be used in the ECS 100 of FIG. 1. The heat exchanger assembly 105" can be the same as the heat exchanger assembly 105 in FIG. 1; therefore, the reference numbers in FIG. 4 correspond to those in FIG. 1. The double headed arrows in FIG. 4 are intended to show that air can be going in or out, depending on the ECS 100 requirements.

FIG. 5A-1 to FIG. 5A-6 schematically depict, according to various embodiments, a selectively, catalytically coated air channel that may be employed in one or more of the heat exchangers in the ECS 100. In embodiments, the catalytic coating catalyzes ozone and/or hydrocarbons and/or carbon monoxide. The components of the coating can be those known to catalyze ozone and/or hydrocarbons and/or carbon monoxide. In embodiments, the catalytic coating is only on at least one hot air channel and not on any of the cold air channels. In embodiments, the catalytic coated hot air channel is in at least one the PHX 105b and the MHX 111a.

Figure 5A:
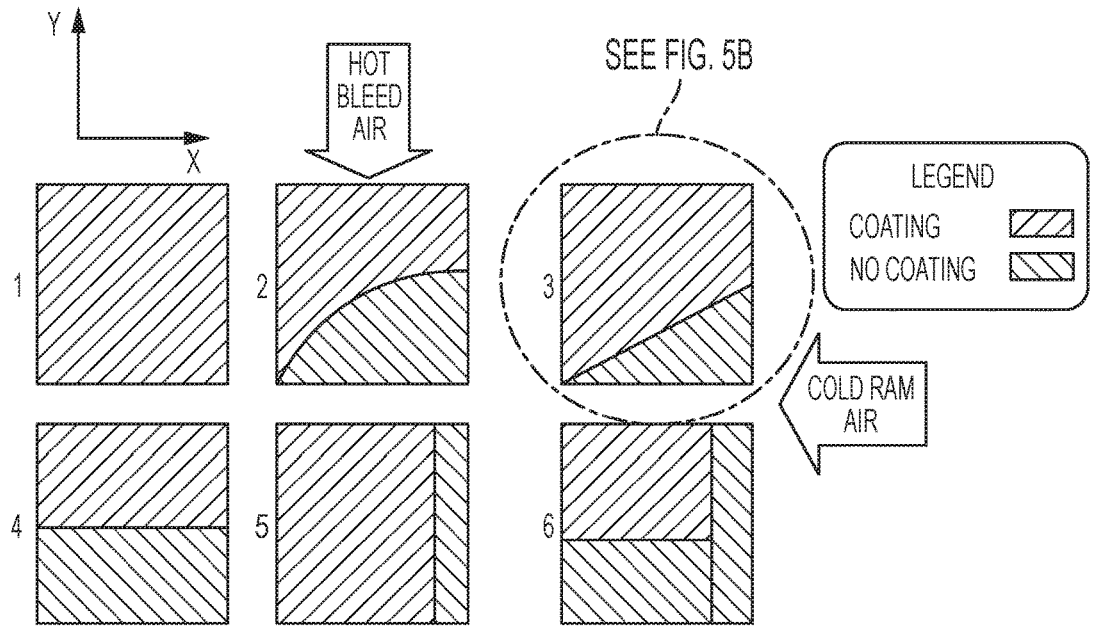
FIGS. 5A-B are schematic views of selectively coated "hot" fins in accordance with exemplary embodiments of the present invention.

In FIG. 5A-1, the catalytic coating coats the entire interior of the hot air channel. In FIGS. 5A-2 to FIG. 5A-6, the coating coats only partially of the interior but in different configurations.

Figure 5B:
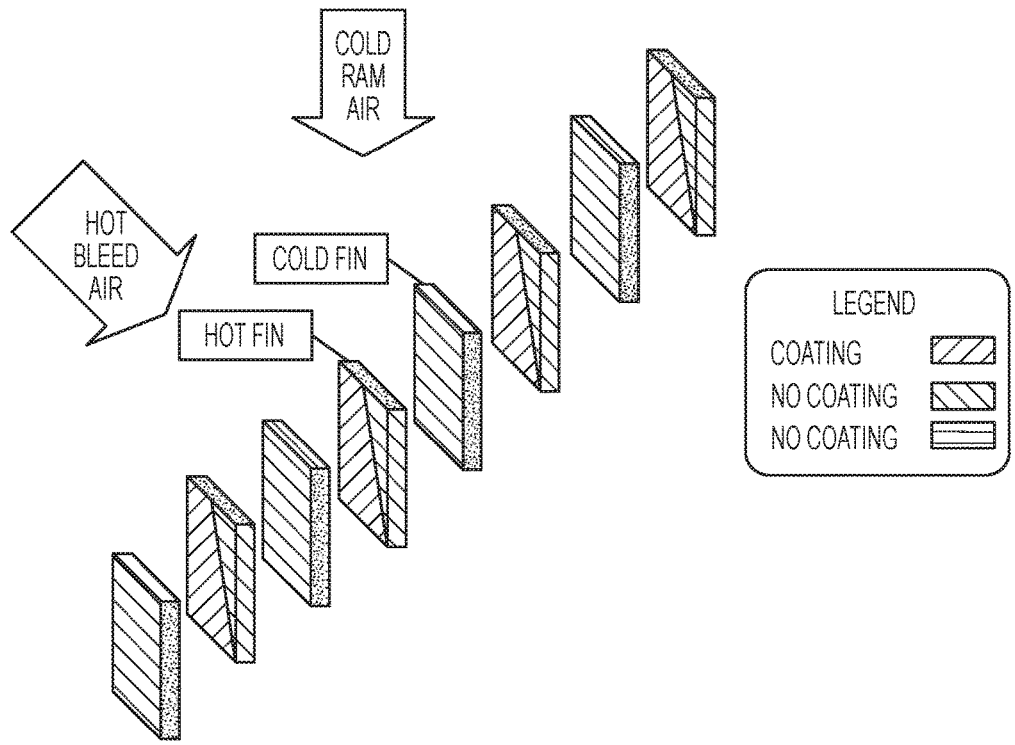

FIG. 5B is a perspective view of FIG. 5A-3, with non-coated and/or coated air channels.

Figure 5C:
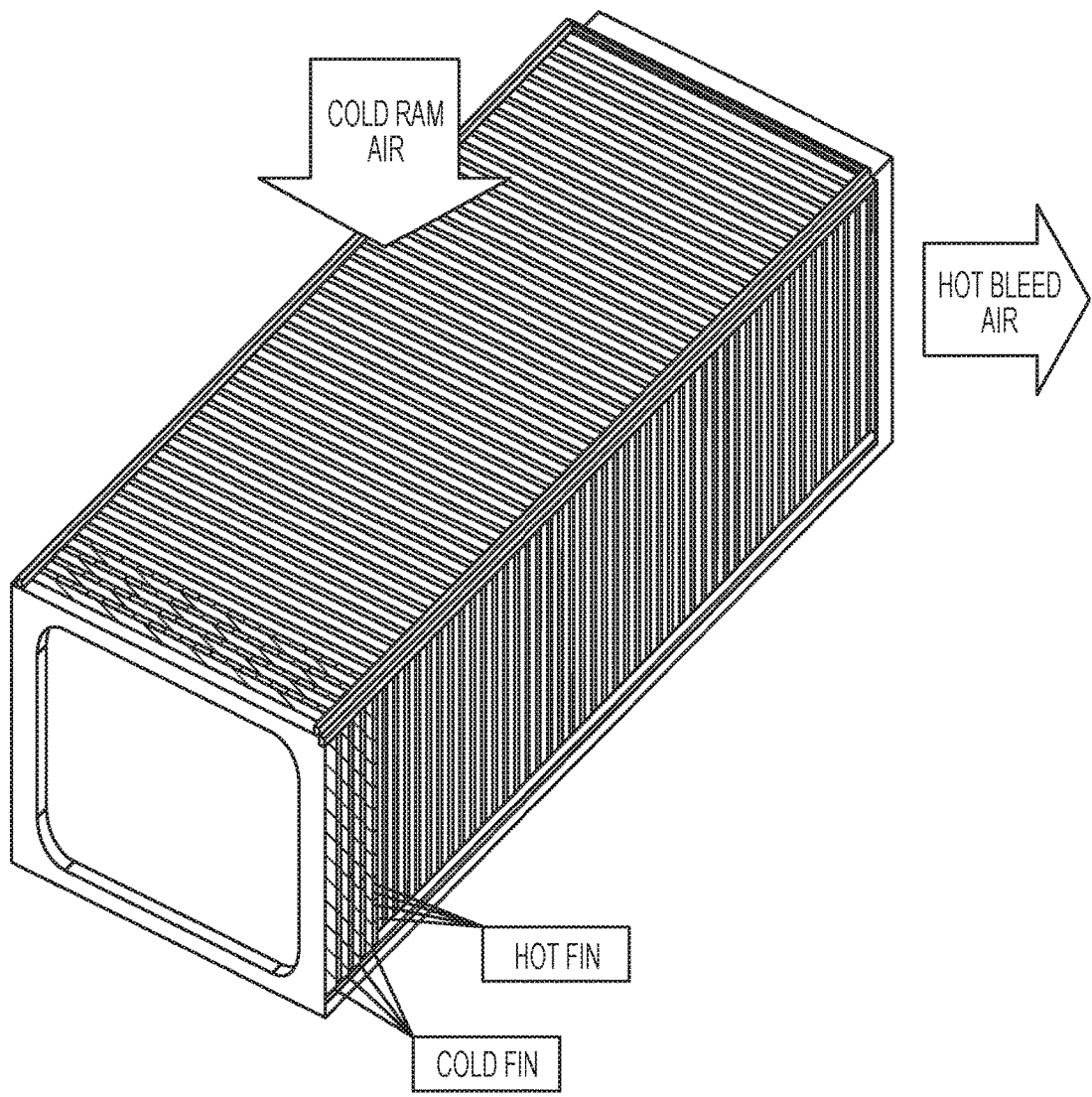
FIG. 5C is a perspective view of a heat exchanger depicting "hot" and "cold" fins in accordance with an exemplary embodiment of the present invention.

FIG. 5C is a perspective view of a cross flow heat exchanger that can employ the coated "hot" fins and uncoated "cold" fins depicted in FIGS. 5A-B.

It should be understood, of course, that the foregoing relates to exemplary embodiments of the invention and that modifications may be made without departing from the spirit and scope of the invention as set forth in the following claims.

We claim:

1. An environmental control system, comprising:
a first air management subsystem having:
a first heat exchanger assembly that includes a first main heat exchanger and a first secondary heat exchanger;
wherein only one of the first main and first secondary heat exchangers have a catalytic coating;
wherein the first main and the first secondary heat exchangers receive a first ambient air;
wherein the first main heat exchanger receives a first non-ambient air;
wherein the first secondary heat exchanger receives a second non-ambient air;
a first air cycle machine that produces the first non-ambient air into the first heat exchanger assembly and that produces a first conditioned air to a first enclosed environment;
a second air management subsystem having:
a second heat exchanger assembly that includes a second main heat exchanger and a second secondary heat exchanger;
wherein only one of the second main and second secondary heat exchangers have a catalytic coating;
wherein the second main and the second secondary heat exchangers receive a second ambient air;
wherein the second main heat exchanger receives a third non-ambient air;
wherein the second secondary heat exchanger receives the third non-ambient air;
a second air cycle machine downstream of the second secondary heat exchanger and that produces a second conditioned air to the second main heat exchanger and further to a second enclosed environment.

2. The system of claim 1, wherein the first secondary heat exchanger has the catalytic coating.

3. The system of claim 1, wherein the second main heat exchanger has the catalytic coating.

4. The system of claim 1, wherein the second non-ambient air is produced by a source other than the first air cycle machine.

5. The system of claim 1, wherein the first air management subsystem further has a condenser downstream of the first air cycle machine.

6. The system of claim 1, wherein the first air management subsystem further has a reheater upstream of the first air cycle machine.

7. The system of claim 1, wherein the first air management subsystem conditions the first non-ambient air in the absence of at least one of an ozone converter, a hydrocarbon converter, and a carbon monoxide converter upstream of the first heat exchanger assembly.

* * * * *